Figure 21:
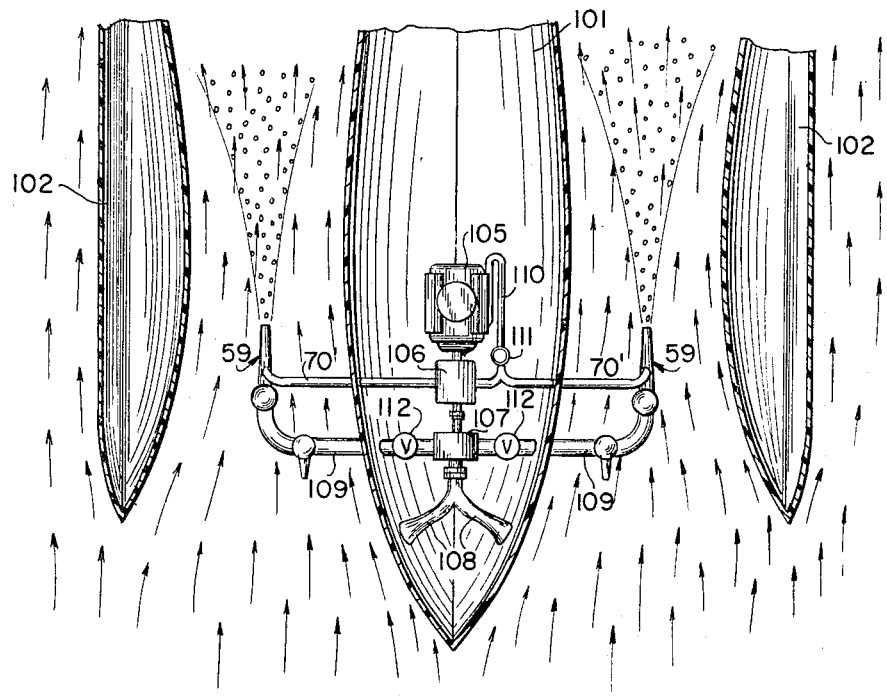

Nov. 29, 1966   C. B. COX ET AL   3,288,100
BOAT AND JET PROPULSION MEANS THEREFOR
Filed June 26, 1964   6 Sheets-Sheet 1
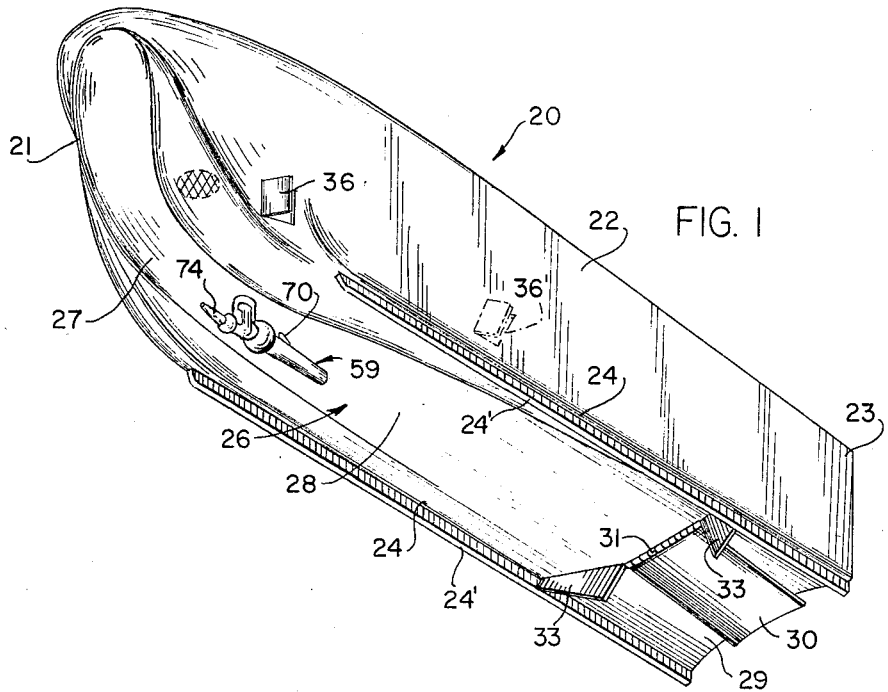
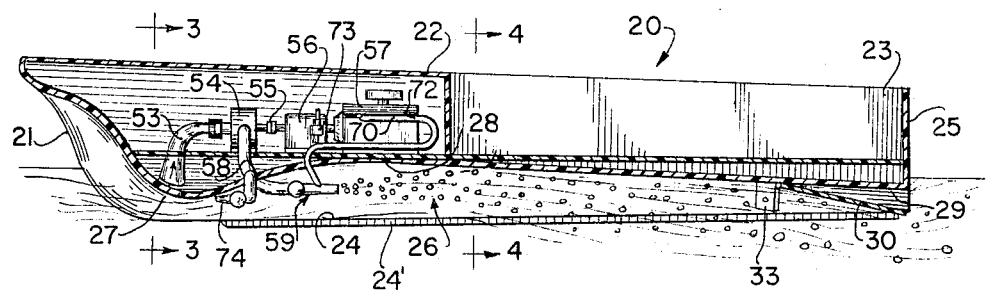
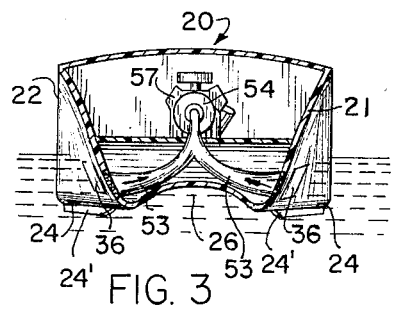
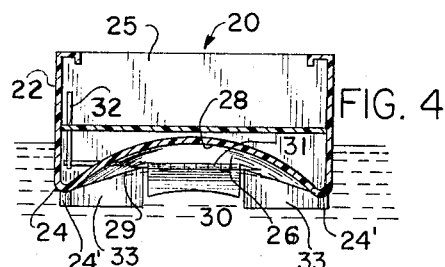
INVENTOR
JOE M. VALDESPINO
CLIFFORD B. COX
BY
ATTORNEY

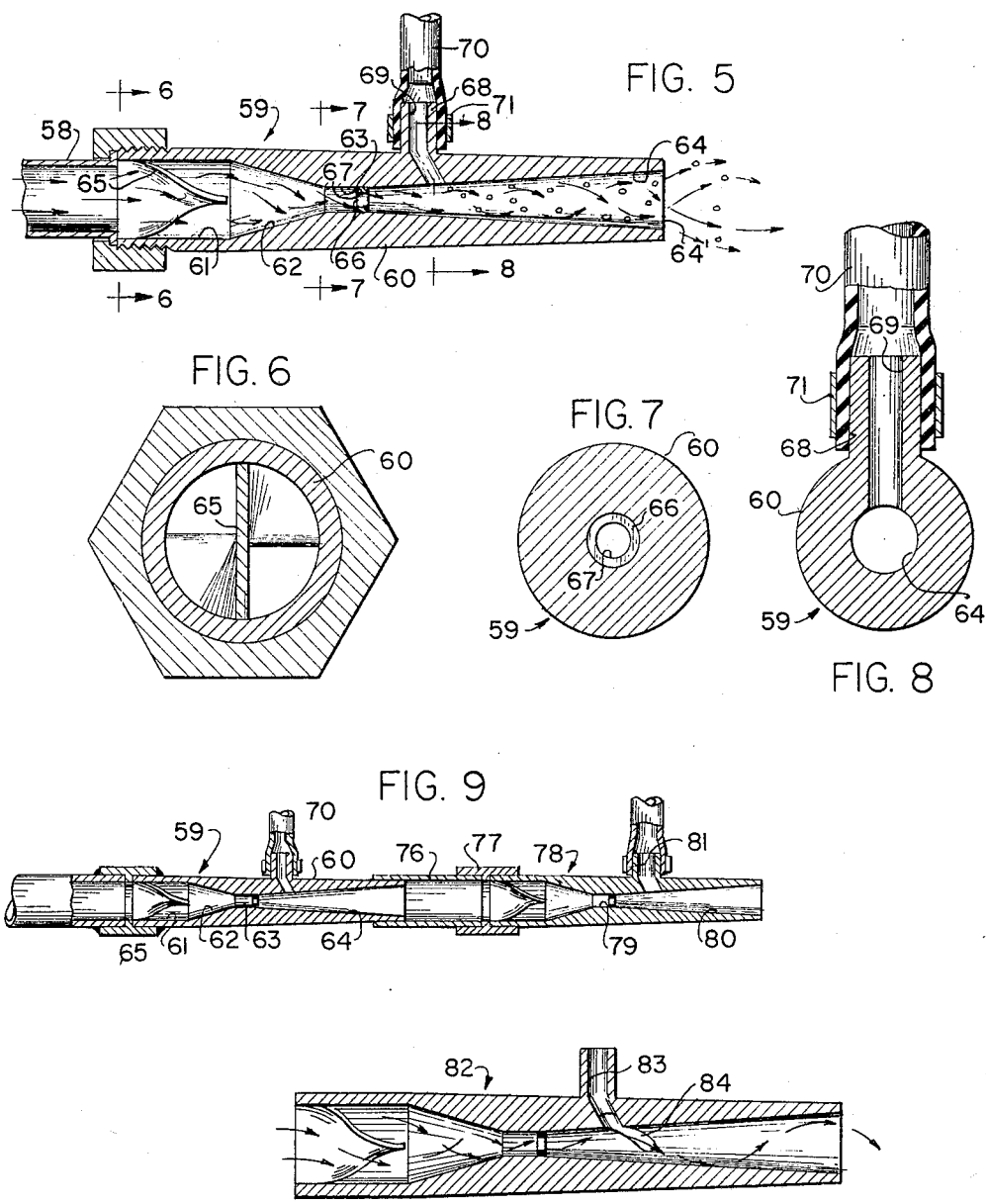

Nov. 29, 1966   C. B. COX ET AL   3,288,100
BOAT AND JET PROPULSION MEANS THEREFOR
Filed June 26, 1964   6 Sheets-Sheet 3

INVENTOR
JOE M. VALDESPINO
CLIFFORD B. COX
BY
ATTORNEY

Nov. 29, 1966     C. B. COX ET AL     3,288,100
BOAT AND JET PROPULSION MEANS THEREFOR
Filed June 26, 1964     6 Sheets-Sheet 4
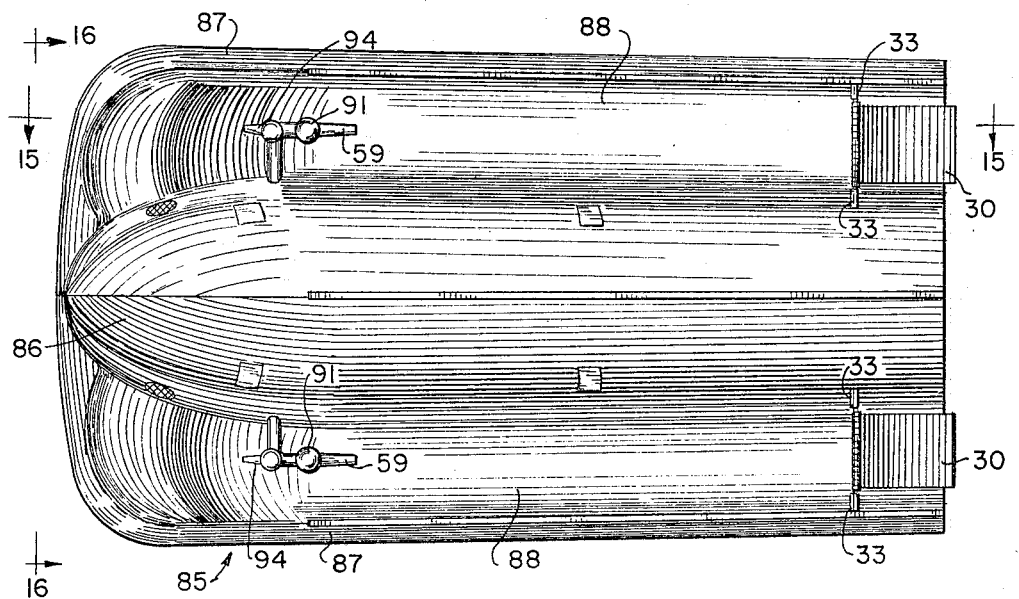
FIG. 14
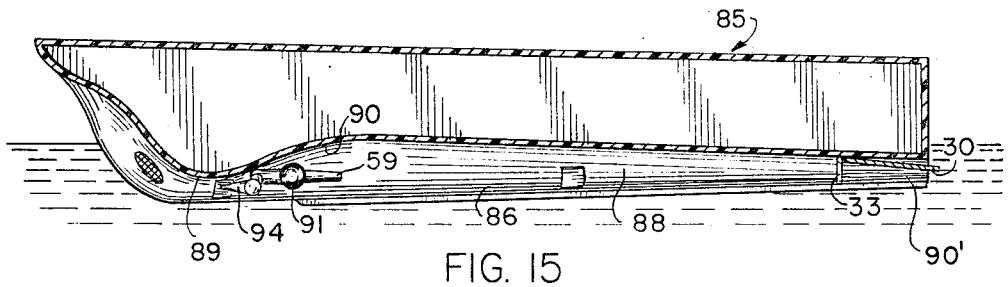
FIG. 15
FIG. 16
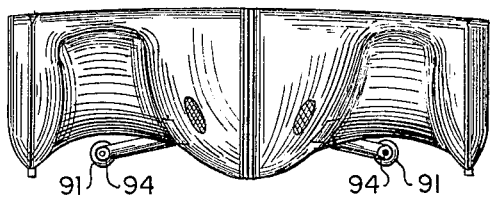
INVENTOR
JOE M. VALDESPINO
CLIFFORD B. COX
BY
ATTORNEY Nov. 29, 1966  C. B. COX ET AL  3,288,100
BOAT AND JET PROPULSION MEANS THEREFOR
Filed June 26, 1964  6 Sheets-Sheet 5

INVENTOR.
JOE M. VALDESPINO
CLIFFORD B. COX

BY

ATTORNEYS

Nov. 29, 1966 C. B. COX ET AL 3,288,100
BOAT AND JET PROPULSION MEANS THEREFOR
Filed June 26, 1964 6 Sheets-Sheet 6

INVENTOR
JOE M. VALDESPINO
CLIFFORD B. COX
BY
ATTORNEY

United States Patent Office 3,288,100
Patented Nov. 29, 1966

3,288,100
BOAT AND JET PROPULSION MEANS THEREFOR
Clifford B. Cox, Chicago, Ill., and Joe M. Valdespino, Orlando, Fla., assignors to Clifford B. Cox, Chicago, Ill., Joe M. Valdespino, Orlando, Fla., James C. Robinson, Orlando, Fla., and Floyd Groo, Orlando, Fla.
Filed June 26, 1964, Ser. No. 378,312
6 Claims. (Cl. 115—11)

This invention relates to aquatic vehicles and to apparatus and equipment for propelling such vehicles by means of a liquid medium at an increased velocity and with minimum power requirements.

The invention relates particularly to boats which utilize water under pressure for the thrust for moving the same, as well as mechanism for increasing such thrust without a corresponding increase in the power requirements or the size and capacity of the power plant.

Heretofore boats or other aquatic vehicles have been in use propelled by paddles, sails, and inboard and outboard engines. Also efforts have been made toward propelling the boat by means of water under pressure directed against the water supporting the boat to propel such boat through the water. The methods of boat propulsion which required power of one kind or another have not been equal to modern day demands for speed and have required larger and larger power plants within the boats; however, the resulting increase in speed has not been commensurate with the size of the power plants which have been required to produce such speed. Likewise the cost of the power plants has increased out of proportion to the small increase obtained in the velocity of the boat.

It is an object of the invention to provide a boat having a constricted tunnel lengthwise thereof for the entrapment of water and propulsion means in which the water is removed from the surrounding area and forced under pressure through a venturi type aspirator nozzle having means for entraining air or other gas in the water under pressure to increase the velocity of the boat.

Another object of the invention is to provide a nozzle with means to entrain a maximum amount of air in proportion to the volume of liquid passing through the nozzle.

Another object of the invention is to provide a power unit having greater thrust than conventional power plants of the same horsepower rating or the same thrust with smaller horsepower rating.

A further object of the invention is to provide a boat and propulsion means therefor in which the propulsion means will raise and reduce the draft and coefficient of friction of the boat in the water.

A still further object of the invention is to provide a boat hull with one or more tunnels along the bottom thereof and with jet propulsion means in the forward portion of each tunnel having means for introducing air into the discharge thereof and trapping such discharge within the tunnels so that the boat hull will be supported on bubbles of air.

Figure 11:
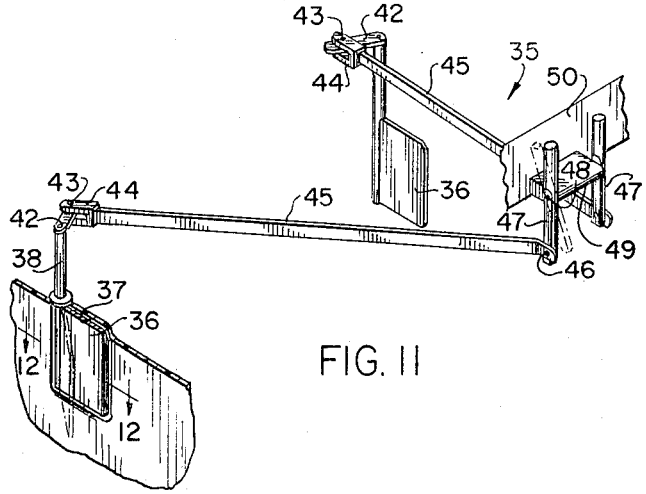
Figure 12:
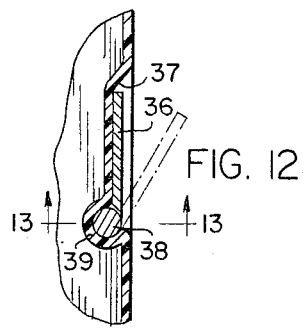
Figure 13:
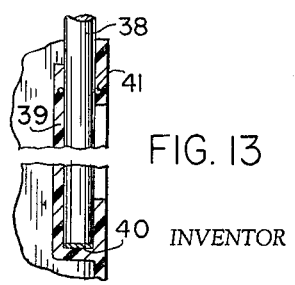
Figure 17:
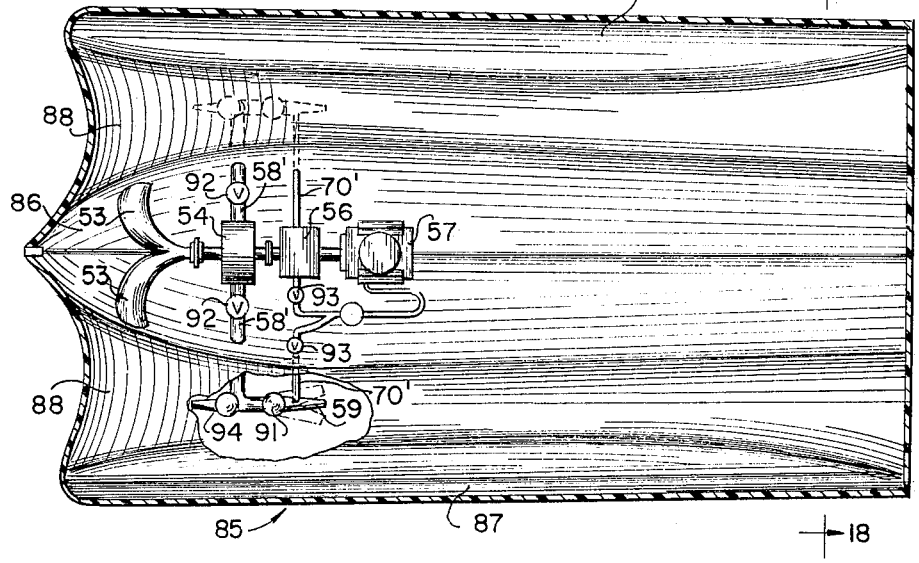
Figure 18:
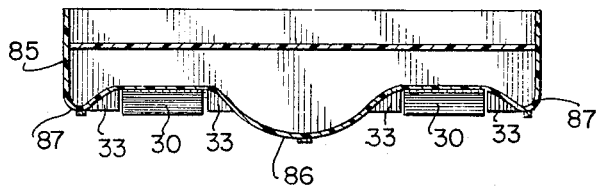
Figure 19:
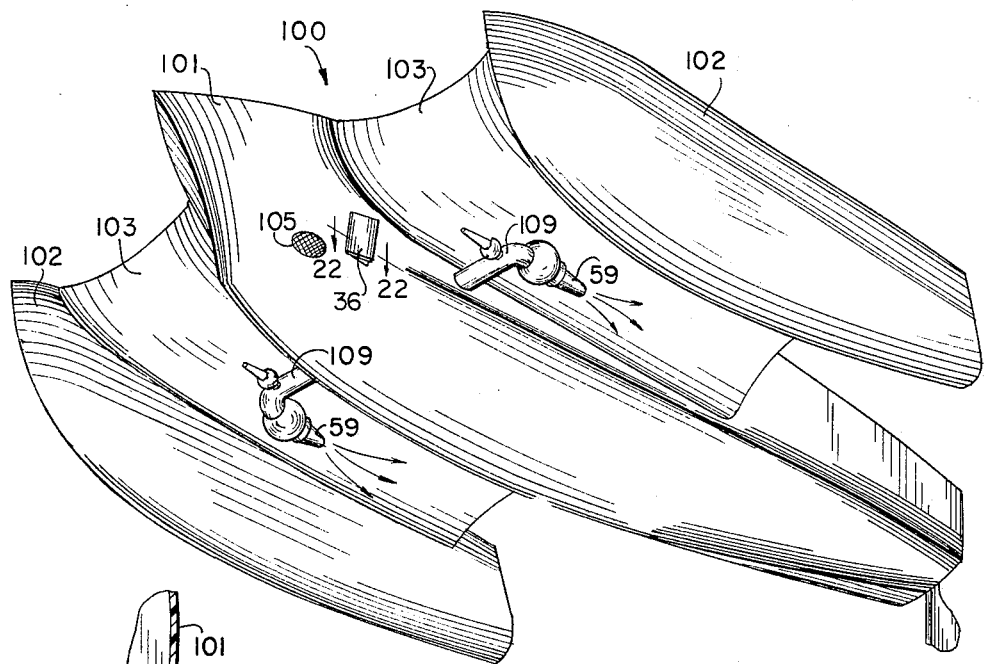
Figure 20:
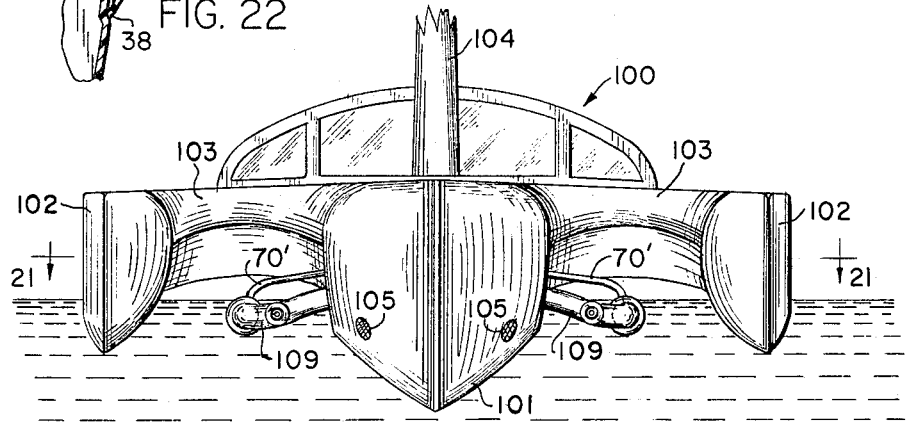

Other objects and advantages of the invention will be apparent from the following description taken in conjunction with the accompanying drawings in which:

FIG. 1 is a bottom perspective of a boat in accordance with the present invention and illustrating the position of the venturi type jet propulsion nozzle;

FIG. 2, a longitudinal section thereof;

FIG. 3, a transverse sesction on the line 3—3 of FIG. 2;

FIG. 4, a transverse section on the line 4—4 of FIG. 2;

FIG. 5, an enlarged longitudinal section of the jet propulsion nozzle itself;

FIGS. 6, 7, and 8, enlarged transverse sections on the lines 6—6, 7—7, and 8—8 respectively of FIG. 5;

FIG. 9, a modified form of jet propulsion nozzle illustrating a plurality of nozzles in a series arrangement;

FIG. 10, a view similar to FIG. 5 of a further modified form of nozzle;

FIG. 11, a fragmentary perspective illustrating the steering control and brakes;

FIG. 12, an enlarged detail section on the line 12—12 of FIG. 11;

FIG. 13, a section on the line 13—13 of FIG. 12;

FIG. 14, a bottom plan view of a modified boat having a plurality of tunnels therealong;

FIG. 15, a longitudinal section thereof taken along one of the tunnels;

FIG. 16, a front elevation of the boat of FIG. 14;

FIG. 17, a section taken on the line 17—17 of FIG. 16;

FIG. 18, a section taken on the line 18—18 of FIG. 17;

FIG. 19, a bottom perspective of a further modified boat of the trimaran type;

FIG. 20, a front elevation thereof;

FIG. 21, a section on the line 21—21 of FIG. 20; and

Figure 22:
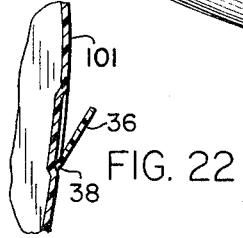

FIG. 22, an enlarged fragmentary section on the line 22—22 of FIG. 19.

Briefly stated the present invention is a boat having a hull with one or more tunnels or longitudinal concavities disposed lengthwise thereof along the bottom from the bow to the stern and such tunnels or concavities preferably are relatively shallow at the bow and increase sharply in the forward mid-ship portion and then decrease gradually toward the stern. The hull is adapted to be propelled by jet propulsion means and includes a venturi type aspirator nozzle located forwardly of the center of gravity of the boat and connected to a water pump driven by any suitable source of power such as an internal combustion engine, which receives water from scoops located in the bow of the boat and forces such water through the venturi nozzle. The source of power preferably is mounted in the forward portion of the midship section so that the weight distribution will be concentrated about the center of gravity of the boat. Air is admitted to the discharge or negative pressure side of the venturi nozzle to increase the thrust as well as to lift the boat and reduce frictional drag thereon.

With continued reference to the drawings, a boat 20 is provided having a bow portion 21, a midship portion 22, and a stern portion 23. The bow portion preferably is shaped to direct spray, caused by the moving of the boat through the water, inwardly and downward beneath the boat. The midship portion is provided with relatively straight sides terminating in a hard chine 24 and the stern portion 23 terminates in a transom 25. If desired, a skeg 24' of conventional construction may be located beneath both sides of the hull adjacent to the chine 24 to prevent skidding when the boat is turned. The bottom of the boat has a concave tunnel or concavity 26 extending longitudinally thereof. The tunnel 26 has a relatively shallow portion 27 in the area of the bow portion 21 and thereafter such tunnel increases sharply to a relatively deep portion 28 in the forward end of the midship section 22 and then gradually tapers to a relatively shallow portion 29 at the stern. If desired, a trim flap 30 may be disposed in the tunnel 26 adjacent to the stern portion 23, and such trim flap may be mounted on a hinge 31 and controlled by an operating lever 32 located within the interior of the boat. An auxiliary baffle 33 is located on each side of the trim flap 30 for directing air and water in the tunnel to such trim flap.

A steering control mechanism 35 (FIG. 11) is provided and includes a pair of planes or vanes 36, one on each side of the boat extending below the water line. For more positive control of the boat, the steering vanes 36 preferably are disposed along the sides of the boat and positioned so that when the vanes are operated, the boat will pivot about the center of gravity and turn in a shorter radius than would be possible with the rudder at the stern. The vanes normally are disposed in recesses 37 (FIG. 12) in the hull of the boat in such a manner that either vane can be extended selectively for steering, or both vanes may be extended simultaneously to provide a braking action. Each of the vanes is connected at its forward end to a post 38, and such post may be located in an enlargement 39 having a thrust washer 40 disposed in the bottom thereof. An O-ring or other packing gland 41 is mounted in the upper portion of the enlargement 39 to permit rotation of the post 38 while preventing the ingress of water.

An arm 42 is connected to the upper end of each post, and such arm is pivotally connected by a pin 43 to a clevis 44 carried on one end of a link 45. The opposite end of the link is connected by a pivot pin 46 to one end of a control lever 47, and such control lever is pivotally mounted by a pin 48 intermediate its ends to a bracket 49 fixed to the dashboard 50 of the boat. In this manner when the upper portion of either operating lever 47 is moved forwardly, the lower end of such lever and the link 45 connected thereto will be moved rearwardly, which in turn rotates the post 38 and causes the vane 36 to extend outwardly from the boat. When the vane is extended, it will form an obstruction and cause the boat to turn. If both vanes are extended simultaneously, they will function as brakes to retard the progress of the boat through the water. Also the vanes may be extended in varying amounts to function as brakes and steering control at the same time.

The vanes 36 preferably are located forwardly of the center of gravity and buoyancy of the boat and if desired, auxiliary vanes 36' shown in phantom in FIG. 1 may be located rearwardly thereof for more positive control. The auxiliary vane 36' on the port or left side of the boat is connected to the control lever 47 which operates the vane 36 on the starboard or right side of the boat and the auxiliary vane 36' on the starboard side of the boat is connected to the control lever 47 which operates the vane 36 on the port side. The vanes on opposite sides of the boat and on opposite sides of the center of gravity cooperate to turn the boat in each direction. The auxiliary vanes 36' preferably are pivoted along the trailing edge so that they form a pocket when operated.

The venturi type jet propulsion includes a pair of water scoops 53 located below the water line of the forward portion of the boat, and such scoops are adapted to direct the water inwardly and upwardly into a pump 54 connected by a flexible coupling 55 to a transmission or marine conversion unit 56. The transmission may be driven by an internal combustion engine 57 so that the pump may be driven at any desired speed. Desirably, the transmission 56 and engine 57 are located in the forward part of the midship portion 22 and about the center of gravity and buoyancy of the boat for better balance. The pump discharges water through a discharge pipe 58 into a venturi type nozzle 59 located in the relatively deep portion 28 of the tunnel 26 and preferably ahead of the center of gravity to lift the bow slightly.

The nozzle 59 includes a body 60 having a cylindrical bore 61 in one end which terminates in a high pressure frusto-conical converging portion 62 leading into a constricted throat 63 and then into a frusto-conical diverging discharge portion 64 in which a negative pressure is created when the nozzle is in operation. The discharge portion 64 has a mouth or discharge opening 64' of a diameter less than the diameter of the cylindrical bore 61. The laminar flow of the water is adapted to be disrupted in any desired manner as by a twisted vane or auger 65 fixed within the cylindrical bore 61 to create turbulence in the form of a spiral or helical path. A ring 66 having a sharp edged orifice 67 is mounted within the constricted throat 63 to encourage a strong negative pressure in the diverging discharge portion 64 and to increase the velocity of the stream of water passing therethrough while the pressure remains substantially constant.

The body 60 is provided with a projection 68 having an opening 69 extending radially through the body into the diverging portion 64 in spaced relation to the constricted throat 63. A hose or other conduit 70 is attached to the projection 68 by means of a clamp 71, and such hose is connected to a source of air supply such as the exhaust manifold 72 of the internal combustion engine 57 for removing noxious and toxic gases therefrom. A relief valve 73 is interposed in the hose 70 to permit additional air under atmospheric pressure to enter the hose after a predetermined vacuum has been reached.

As the water passes through the nozzle 59, the laminar flow is disrupted by the auger 65 which causes turbulence after which the water is forced through the orifice 67 in the constricted throat 63. Since the water is under a predetermined pressure, the velocity of such water is greatly increased as it passes through such orifice while the pressure remains substantially constant. When the water enters the diverging discharge portion 64 of the nozzle, the velocity thereof tends to decrease due to the spreading out of the water in the enlarging cross-sectional diverging portion 64, as well as the suctional drag created within the negative pressure area.

The negative pressure in the diverging portion will draw air through the opening 69 and will cause such air to be entrained in the water to relieve such negative pressure and increase the volume of the water and thereby alter the specific gravity thereof to accelerate the flow of fluid through the nozzle. Also, the negative pressure within the venturi will draw in air which will occupy part of the space occupied by the water and cause the water to flow at an accelerated rate. It is noted that the hot air and gases from the internal combustion engine tend to expand more rapidly and to be entrained more easily in the water.

The mixture of air and water discharged from the nozzle is trapped within the tunnel of the boat and since the specific gravity of such mixture is less than the surrounding water, a body of air will be created which will tend to lift the boat and reduce the coefficient of friction on the hull and thereby increase the acceleration and velocity of the boat.

A smaller non-aspirating nozzle 74 is connected to the discharge pipe 58 by a swivel valve 75 which can be opened or closed and directionally controlled in any conventional manner. The nozzle 74 is used to move the boat in reverse as well as for minor steering effects.

The trim flap 30 may be lowered to cause the stern portion 23 to rise slightly and thereby cause the bow portion 21 to remain in the water so that water will enter the scoops 53 regardless of the speed of the boat.

With reference to FIG. 9, a modified form of nozzle is provided in which a plurality of venturi type nozzles are staged in end-to-end relation. In this modification, the first venturi type nozzle 59 discharges a mixture of water and air into a sleeve 76 connected by a coupling 77 to a second venturi type nozzle 78 having a slightly larger constricted throat 79 and a slightly larger diverging portion 80. The second nozzle 78 has an opening 81 which is slightly larger than the opening 69 in the nozzle 59 so that a greater amount of air and gas can be entrained within the fluid being discharged which will further increase the velocity thereof. It is contemplated that additional nozzles could be added to further increase the velocity and thrust of the water being discharged.

With reference to FIG. 10, another modified form of nozzle 82 is disclosed having an opening 83 for admitting air into the diverging portion of the nozzle and such opening terminates in an internal groove 84 to expose a greater amount of air to the water and thereby cause a greater amount of air to be entrained therein. Since the water is moving through the venturi nozzle in a spiral pattern, it is desirable to have the groove follow such pattern to take advantage of the movement of the stream of water to entrain a maximum amount of air therein. If desired, the groove 84 may be replaced with a series of orifices which would have substantially the same result.

With reference to FIGS. 14–18, a modified form of boat hull 85 is provided having a relatively deep central portion 86 and relatively shallow side portions 87 connected to the central portion by longitudinal tunnels or concavities 88, each of which is similar in construction to the tunnel 26. Each of the tunnels has a relatively shallow portion 89 adjacent to the bow portion of the boat and thereafter the height of the tunnel increases sharply to a relatively deep portion 90 and then gradually tapers to a relatively shallow portion 90' at the stern of the boat. The relatively deep central portion 86 will provide stability for the hull 85 and the spray and foam caused by the passage of the boat through the water will be directed into and trapped within the tunnels 88.

A venturi type aspirator nozzle 59 is located in the relatively deep portion 90 of each tunnel, such nozzles being mounted on swivel connections 91 and operated in any desired manner. Water under pressure is supplied to the nozzle 59 through scoops 53, pump 54, transmission 56, engine 57, and discharge pipes as previously described. Instead of a single discharge pipe 58, and a single air hose 70, a discharge pipe 58' is provided from the pump to each of the nozzles and normally supplies an equal amount of water under pressure to each nozzle and an air hose 70' connects each nozzle to the engine 57. If desired, a valve 92 may be interposed in each discharge pipe 58' and a valve 93 may be interposed in each air hose 70' to assist in steering the boat or to provide for special effects such as maintaining a true course in a quartering sea. The valves 92 and 93 may be operated directly or from a remote position to regulate the amount of water and air being discharged from each of the nozzles.

A selectively operable auxiliary nozzle 94 is connected to each of the discharge pipes 58' to serve as a reverse for the boat and to provide special steering effects.

With reference to FIGS. 19–22, a modified form of boat 100 is provided having a trimaran type of hull. Such hull includes a central or main hull 101 and a pair of outrigger or auxiliary hulls 102, one located outwardly of each side of the main hull and connected thereto by an intermediate deck or bridge 103. This type of boat normally is used as a sailboat and includes a mast 104 on which the sail is mounted. However, it is desirable to provide an auxiliary means of propulsion for propelling the boat under power when desired.

This is accomplished by providing a relatively small internal combustion engine 105 located in the forward portion of the main hull 101 and adapted to drive a transmission 106. Such transmission is connected to drive a water pump 107 which receives water from a pair of scoops 108 located in the bow of the boat, and such pump discharges the water under pressure through a pair of discharge pipes 109 into venturi type nozzles 59. The nozzles 59 are located in the channel between the main hull 101 and the auxiliary hulls 102 on each side and forwardly of the engine 105 to provide twin jets for propelling and lifting the boat. Each of the nozzles 59 is connected by an air hose 70' to the exhaust manifold 110 of the engine 105, and such hose has a relief valve 111 to provide an auxiliary source of air under atmospheric pressure when required to satisfy the demands of the nozzles 59. It is contemplated that the discharge pipes 109 may be controlled by independent valves 112 so that the boat can be steered by the propelling means merely by controlling the supply of water under pressure through the discharge pipes, or the boat may have a steering control mechanism with vanes 36 as previously described.

In the operation of the device, water is caused to enter the scoops 53 or 108 and such water is directed to the pump 54 or 107 where it is then discharged through the discharge pipe 58, 58' or 109 and the venturi type nozzle 59. The nozzle is located within a tunnel 26 or 88 which is filled with water, and the discharge of the water from the nozzle against the water in the tunnel causes a reaction which moves the boat in a forward direction while lifting the bow slightly. The introduction of air into the negative pressure side of the venturi nozzle will increase the velocity of water passing through such nozzle and thereby increase the thrust which propels the boat. Simultaneously the mixture of water and air from the nozzle is of lighter specific gravity than the water in the tunnel and therefore the water being discharged from the nozzle will tend to lift the boat and reduce the frictional drag on the hull and thereby further increase the velocity of the boat.

It will be apparent that a relatively simple boat and jet propulsion means therefor has been provided utilizing a venturi type nozzle which introduces air into the stream of water through the nozzle and thereby increases the velocity of fluid and the thrust for propelling the boat.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of a boat having a tunnel along the length thereof, said tunnel being relatively shallow at the bow and increasing sharply to a relatively deep intermediate portion and then tapering gradually to a relatively shallow portion at the stern, jet propulsion means mounted on said boat and including a pump within the forward portion of said boat, means for admitting water to said pump from the exterior of said boat, a source of power for driving said pump, a venturi type aspirator nozzle located within the relatively deep portion of said tunnel constructed to receive water under pressure from said pump, said nozzle having a bore at one end connected to a reduced throat and a diverging discharge from said throat, an opening located in said diverging portion in spaced relation to said throat for admitting air into the water passing through said nozzle whereby said air would be entrained in the water and cause accelerated thrust thereof.

2. A boat hull having at least one tunnel extending the length thereof, said tunnel being relatively shallow at the bow and increasing sharply to a relatively deep portion and then gradually tapering to a relatively shallow portion at the stern, jet propulsion means including a pump mounted within the forward portion of said hull, means for directing a supply of water to said pump, a source of power for driving said pump, said source of power being located substantially at the center of gravity of said hull, a venturi type aspirator nozzle located within the relatively deep portion of said tunnel and adapted to receive water under pressure from said pump, said nozzle having a cylindrical bore at one end terminating in a frusto-conical converging portion connected to a constricted throat which terminates in a frusto-conical diverging portion, an aspirator opening located in said diverging portion and in spaced relation to said throat for admitting air into said water under pressure, whereby said air will be entrained in said water to decrease the specific gravity thereof and thereby increase the velocity and thrust of said water under pressure.

3. The structure of claim 1 including an auger mounted in said cylindrical bore for disrupting the laminar flow of said water under pressure and creating turbulence.

4. The structure of claim 1 including a ring having a sharp edged orifice located in said constricted throat to increase the velocity of said water under pressure.

5. The structure of claim 1 including an adjustable trim flap located in said tunnel adjacent to the stern portion of said boat.

6. The combination of a boat and jet propulsion means therefor comprising a hull having at least one tunnel extending the length thereof, said tunnel being relatively shallow at the bow and increasing sharply to a relatively deep portion and then gradually tapering to a relatively shallow portion at the stern, jet propulsion means including a pump mounted within said hull, means for supplying water to said pump, a source of power for driving said pump, a venturi-type aspirator nozzle located within the relatively deep portion of said tunnel and adapted to receive water under pressure from said pump, an air line connected to said nozzle for admitting air under atmospheric pressure into the water being discharged therefrom, whereby said air will be entrained in said water and trapped within said tunnel to provide a cushion for said hull.

References Cited by the Examiner
UNITED STATES PATENTS

| | | | |
|---|---|---|---|
| 215,842 | 5/1879 | Tucker | 115—11 |
| 793,944 | 5/1905 | Manker | 114—62 |
| 2,285,023 | 6/1942 | Fergus | 115—39 |
| 2,322,790 | 6/1943 | Cristadoro | 114—67 |
| 2,348,106 | 5/1944 | Brian et al. | 115—11 |
| 2,450,665 | 10/1948 | Jutte | 115—11 |
| 2,699,644 | 1/1955 | Coanda | 60—35.5 |
| 3,117,545 | 1/1964 | Warner | 114—67 |
| 3,183,663 | 5/1965 | Sfredda | 60—35.5 |
| 3,188,997 | 6/1965 | Christensen | 115—11 |

MILTON BUCHLER, *Primary Examiner.*

T. M. BLIX, *Assistant Examiner.*